(12) United States Patent
Hoyle

(10) Patent No.: US 8,777,707 B2
(45) Date of Patent: Jul. 15, 2014

(54) SPREADER WITH GPS GUIDED SPREAD PATTERN

(76) Inventor: David Stanley Hoyle, Maungaturoto (NZ)

( * ) Notice: Subject to any disclaimer, the term of this patent is extended or adjusted under 35 U.S.C. 154(b) by 1039 days.

(21) Appl. No.: 12/681,331

(22) PCT Filed: Oct. 3, 2008

(86) PCT No.: PCT/NZ2008/000259
§ 371 (c)(1),
(2), (4) Date: Oct. 7, 2010

(87) PCT Pub. No.: WO2009/045114
PCT Pub. Date: Apr. 9, 2009

(65) Prior Publication Data
US 2011/0015832 A1 Jan. 20, 2011

(30) Foreign Application Priority Data
Oct. 4, 2007 (NZ) ........................................ 562273

(51) Int. Cl.
*A01F 12/30* (2006.01)
(52) U.S. Cl.
USPC ........................................ 460/111; 460/112
(58) Field of Classification Search
USPC .................. 460/111, 112; 239/1, 7, 682, 684; 701/50, 400, 408, 410, 468; 340/988; 700/282–284
See application file for complete search history.

(56) References Cited

U.S. PATENT DOCUMENTS

| 4,630,773 | A | 12/1986 | Ortlip |
| 4,892,504 | A * | 1/1990 | Scott et al. ..................... 460/112 |
| 4,964,575 | A | 10/1990 | Takata |
| 5,077,653 | A | 12/1991 | Barlet |
| 5,337,959 | A | 8/1994 | Boyd |
| RE35,100 | E | 11/1995 | Monson et al. |
| 5,704,546 | A | 1/1998 | Henderson et al. |
| 5,768,128 | A | 6/1998 | Thompson et al. |
| 5,775,585 | A | 7/1998 | Duello |
| 5,870,686 | A | 2/1999 | Monson |
| 5,884,205 | A | 3/1999 | Elmore et al. |
| 5,971,294 | A | 10/1999 | Thompson et al. |
| 5,987,383 | A | 11/1999 | Keller et al. |
| 6,000,577 | A | 12/1999 | Nystrom |

(Continued)

FOREIGN PATENT DOCUMENTS

| CN | 1404709 A | 3/2003 |
| CN | 1726750 A | 2/2006 |

(Continued)

*Primary Examiner* — Alicia Torres
(74) *Attorney, Agent, or Firm* — Merchant & Gould P.C.

(57) ABSTRACT

A spreader (100) has a hopper or bin (1) for storing a spreadable material (2), a plurality of spinners (5, 6) adapted to receive the material from the hopper or bin and to spread the material (2) on the ground, and a Global Positioning System (GPS) receiver (8) for sensing the position of the spreader (100) and providing an output signal indicative of a position of the spreader to a controller (7). The controller (7) calculates a required pattern and density of material (2) to be spread by the spinners (5, 6) based on a comparison of the actual position of the spreader (A) to a preferred position of the spreader (I), and controls the spinners (5, 6) in order to obtain the required pattern and density of spread material (2). A method of controlling the pattern and density of material spread by a spreader is also disclosed.

12 Claims, 4 Drawing Sheets

(56) References Cited

U.S. PATENT DOCUMENTS

| | | | |
|---|---|---|---|
| 6,092,745 A | 7/2000 | Seymour et al. | |
| 6,216,614 B1 | 4/2001 | Wollenhaupt | |
| 6,510,367 B1 | 1/2003 | McQuinn | |
| 6,606,542 B2 | 8/2003 | Hauwiller et al. | |
| 6,726,120 B2 | 4/2004 | Schaffter et al. | |
| 6,817,551 B2 | 11/2004 | Williams et al. | |
| 6,905,077 B2 | 6/2005 | Hoyle | |
| 6,938,829 B2 * | 9/2005 | Doherty et al. | 239/1 |
| 7,306,174 B2 * | 12/2007 | Pearson et al. | 239/663 |
| 7,395,769 B2 | 7/2008 | Jensen | |
| 7,993,188 B2 * | 8/2011 | Ritter | 460/111 |
| 8,177,610 B2 * | 5/2012 | Birrell et al. | 460/111 |
| 2001/0018638 A1 * | 8/2001 | Quincke | 701/213 |
| 2003/0018423 A1 | 1/2003 | Saller et al. | |
| 2003/0192967 A1 | 10/2003 | Rissi | |
| 2005/0165521 A1 | 7/2005 | Gruhn | |
| 2006/0265106 A1 * | 11/2006 | Giles et al. | 700/283 |
| 2007/0179704 A1 | 8/2007 | Brunnert | |
| 2008/0248843 A1 * | 10/2008 | Birrell et al. | 460/112 |

FOREIGN PATENT DOCUMENTS

| | | |
|---|---|---|
| CN | 1751554 A | 3/2006 |
| DE | 43 22 293 A1 | 1/1995 |
| DE | 197 04 374 A1 | 8/1998 |
| DE | 198 35 487 A1 | 2/2000 |
| EP | 0 201 658 A1 | 11/1986 |
| EP | 0 609 657 A1 | 8/1994 |
| EP | 0 578 988 A1 | 11/1994 |
| EP | 0 726 024 A1 | 8/1996 |
| EP | 0 917 816 A1 | 5/1999 |
| EP | 1 131 990 A1 | 9/2001 |
| EP | 1 183 929 A1 | 9/2001 |
| EP | 1 181 857 A1 | 2/2002 |
| EP | 1 402 766 A1 | 3/2004 |
| EP | 1 444 879 A1 | 8/2004 |
| EP | 1 625 782 A1 | 2/2006 |
| EP | 1 695 606 A1 | 8/2006 |
| JP | 2004-229633 A | 8/2004 |
| WO | WO 95/01719 A1 | 1/1995 |
| WO | WO 97/12688 A1 | 4/1997 |
| WO | WO 98/21926 A1 | 5/1998 |
| WO | WO 98/21929 A1 | 5/1998 |
| WO | WO 99/17245 A | 4/1999 |
| WO | WO 00/23937 A1 | 4/2000 |
| WO | WO 02/069230 A1 | 9/2002 |

* cited by examiner ns, the method including:
SPREADER WITH GPS GUIDED SPREAD PATTERN This application is a National Stage Application of PCT/NZ2008/000259, filed 3 Oct. 2008, which claims benefit of Serial No. 562273, filed 4 Oct. 2007 in New Zealand and which applications are incorporated herein by reference. To the extent appropriate, a claim of priority is made to each of the above disclosed applications.

FIELD OF THE INVENTION

The present invention relates to apparatus for spreading material onto the ground, and in particular, but not exclusively, to a fertiliser groundspreader which has spreading means which are varied in response to a signal from a GPS receiver.

BACKGROUND OF THE INVENTION

Groundspreaders are used to apply fertiliser and/or other growth enhancing materials to pasture. Optimum pasture growth is dependent on even application of the material. Application of too little material per unit area of land can lead to sub-optimal pasture growth, while over application can kill pasture, and may also lead to problems with contaminated rainwater runoff.

In recent times there has been a move towards equipping groundspreader equipment with Global Positioning System (hereinafter GPS) guidance systems. These systems are intended to increase the consistency of application of the material from the spreader by providing the driver with a visual indication of the correct path for the spreader.

A number of GPS units currently in use are capable of recording the actual course of the spreader relative to the ideal course. This information may be used to confirm to the owner of the land that the material has been spread in a reasonably consistent manner, but may also be particularly useful in assuring local authorities that fertiliser material has not been applied to prohibited areas such as riverbanks.

However, even with GPS guidance, most spreaders do not provide an optimum distribution of material to the ground. In some cases it may be difficult to drive the spreader in accordance with the optimum path. An additional problem is that many guidance systems do not make any allowance for previous deviations from the optimum path. Accordingly it would be desirable if a system were developed which reduced the dependence on the driver of the spreader following an accurate path.

The term "spreader" is used herein to describe any apparatus used to spread material on the ground, and refers in particular to what are sometimes referred to as "broadcast spreaders" or "groundspreaders".

OBJECT OF THE INVENTION

It is an object of the present invention to provide a spreader which automatically adjusts the distribution of the material spread in response to the position and path of the spreader.

It is an alternative object of the present invention to provide a spreader which will overcome or ameliorate problems with the spreaders of the prior art.

It is a further alternative object of the invention to at least provide a useful choice.

Other objects of the present invention may become apparent from the following description, which is given by way of example only.

BRIEF SUMMARY OF THE INVENTION

According to one aspect of the present invention there is provided a spreader apparatus including material storage means for storing a spreadable material, a first spinner means adapted to spread the spreadable material on a first side of the spreader and a second spinner means adapted to spread the spreadable material on a second side of the spreader opposite the first side, wherein a speed of each said spinner is variable independently of a speed of the other said spinner, and transport means for transporting the spreadable material from the material storage means to the spinners, the transport means operable to supply the spreadable material to the first spinner means at a rate which is independent from a rate at which it supplies spreadable material to the second spinner means, the spreader further including Global Positioning System (GPS) receiver means for sensing the position of the spreader and providing an output signal indicative of a position of the spreader to a control means, wherein the control means calculates a required pattern and density of material to be spread by the spinner means based on a comparison of the position of the spreader to a preferred position of the spreader, and controls a rate at which the transport means transports the material to the spinners, and the speed of each spinner means in order to obtain the required pattern and density of spread material.

Preferably the control means varies the pattern and density of material spread by the spinner means as necessary to ensure that the material is spread in accordance with a predetermined pattern.

Preferably the control means varies the pattern and density of material spread by the spinner means as necessary to ensure that the material is spread evenly.

Preferably the spreader includes means to minimise crossover or overlap of material distributed by the first and second spinner means.

Preferably the transport means includes a belt conveyor or a chain conveyor.

Preferably the transport means includes a first conveyor adapted to transport material from the material storage means to the first spinner means and a second conveyor adapted to transport material from the material storage means to the second spinner means.

Preferably the speed of the first conveyor is adjustable independently from the speed of the second conveyor.

Preferably the control means is adapted to store information as to the area in which material has been spread.

According to a second aspect of the present invention there is provided a method of controlling the pattern and density of material spread by a spreader apparatus having a GPS receiver means, a material storage means for storing a spreadable material, a first spinner means adapted to spread the spreadable material on a first side of the spreader and a second spinner means adapted to spread the spreadable material on a second side of the spreader opposite the first side, wherein a speed of each said spinner is variable independently of a speed of the other said spinner, and a transport means for transporting the material from the storage means to the spinners, the method including:

receiving a signal from the GPS receiver which is indicative of the actual position of the spreader apparatus;
comparing the actual position of the spreader apparatus to a preferred position of the spreader apparatus;
controlling a rate at which the transport means supplies the spreadable material to the first spinner means independently from a rate at which it supplies spreadable material to the second spinner means; and controlling a rate at which the transport means transports the material to the spinners, and the speed of the spinner means in order to obtain a required pattern and density of spread material.

Preferably the method includes including varying the pattern and density of material spread by the spinner means as necessary to ensure that the material is spread in accordance with a predetermined pattern.

Preferably the method includes varying the pattern and density of material spread by the spinner means as necessary to ensure that the material is spread evenly.

Preferably the transport means includes a first conveyor adapted to transport material from a material storage means associated with the spreader to the first spinner means and a second conveyor adapted to transport material from the material storage means to the second spinner means, and wherein the speed of the first conveyor is adjustable independently from the speed of the second conveyor.

According to a further aspect of the present invention there is provided a material spreader substantially as herein described with reference to the accompanying drawings.

Further aspects of the invention, which should be considered in all its novel aspects, will become apparent from the following description given by way of example of possible embodiments of the invention.

BEST MODES FOR PERFORMING THE INVENTION

Figure 1:
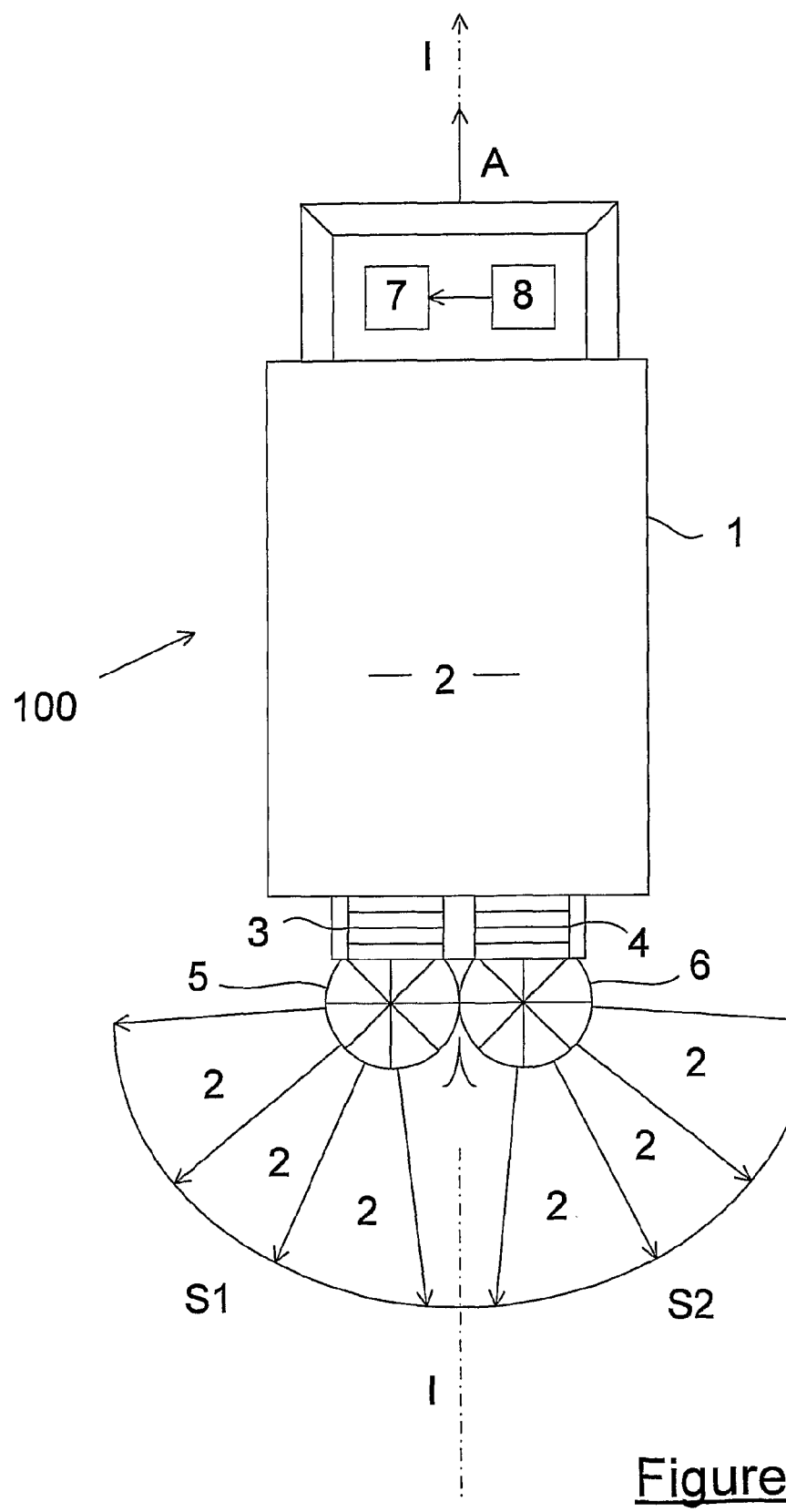
FIG. 1: Is a diagrammatic plan view of a spreader according to one embodiment of the invention proceeding along an ideal or preferred path.

Referring first to FIG. 1, a material spreading apparatus, in this case a truck based groundspreader, is generally referenced 100 and is hereinafter referred to as a "spreader". In common with the spreaders of the prior art the spreader 100 has a hopper or bin 1 in which the material 2 to be spread is stored.

The spreader 100 is provided with two conveyors 3, 4 each of which transports material 2 from the bin 1 to a respective spreading or broadcast means 5, 6. Suitable conveyors are described in the Applicant's Australian patent No. 762502, the contents of which are included herein by reference.

In the embodiment shown the spreading means 5, 6 are centrifugal spinners.

In a preferred embodiment the rate at which material is transported from the bin 1 to the spinners 5, 6 is independently variable. In one embodiment each conveyor 3, 4 is driven by a separate motor, so that the speed of conveyors can be altered independently. In another embodiment, the bin may be provided with variable "doors" which move to adjust the size of the opening in the rear of the bin through which each conveyor emerges, so that the transport rate of the material carried by each conveyor 5, 6 can be adjusted even if the speed of the conveyors remains the same. In a more preferred embodiment both of these techniques may be combined. In yet another embodiment a single conveyor may be used if provided with suitable means to independently control the rate at which the conveyor provides material to the spinners, for example the variable doors mentioned above.

The spinners 5, 6 are preferably adapted to produce minimal crossover of material. In a preferred embodiment the spinners may be provided with a guide or vane system such as that described in International publication No. WO94/03041. The speed of the spinners 5, 6 is also independently variable, that is, the speed of the spinner 5 on one side of the spreader may be varied independently from the speed of the spinner 6 on the other side of the spreader.

The rate of transport of the material to each spinner is controlled by a control means 7, such as a computer or microprocessor based control means. In a preferred embodiment the control means 7 stores information representing the area on which material is to be spread, for example in the form of an electronic map, along with the required rate of application of the spreadable material. The control means adjusts the speed of the spinners and/or the rate at which material is supplied to the spinners in order to ensure that no material is applied to any area other than an area designated as requiring material. Computer control of spinners and conveyers is well known to those skilled in the art and is not described further herein.

The control means 7 receives an input signal from a Global Positioning System (hereinafter GPS) receiver 8 which provides information as to at least the position of the vehicle, and optionally also the direction and speed of the vehicle. Some of the processing may be done by the GPS receiver unit rather than the control means. In a preferred embodiment the control means and the GPS receiver 8 may be integrated into a single unit.

Those skilled in the art will appreciate that even if the GPS receiver 8 does not provide direction and speed information, these can be calculated by the control means based on the position information. More preferably the speed of the spreader may be detected by a separate instrument, for example a radar based speedometer.

The GPS receiver 8 preferably also provides the driver with information as to the actual position of the spreader 100, represented by arrow A, relative to the ideal or preferred path, represented by arrow I, by means known to those skilled in the art.

The control means 7 compares the actual course A with a required or ideal course I and adjusts the rate at which material is supplied to the spinners accordingly, as is described further below. The control means 7 also controls the speed of the spinners 5, 6, thereby controlling the distance from the spreader 100 over which the material is spread, and the pattern of the material spread relative to the spreader.

Figure 2:
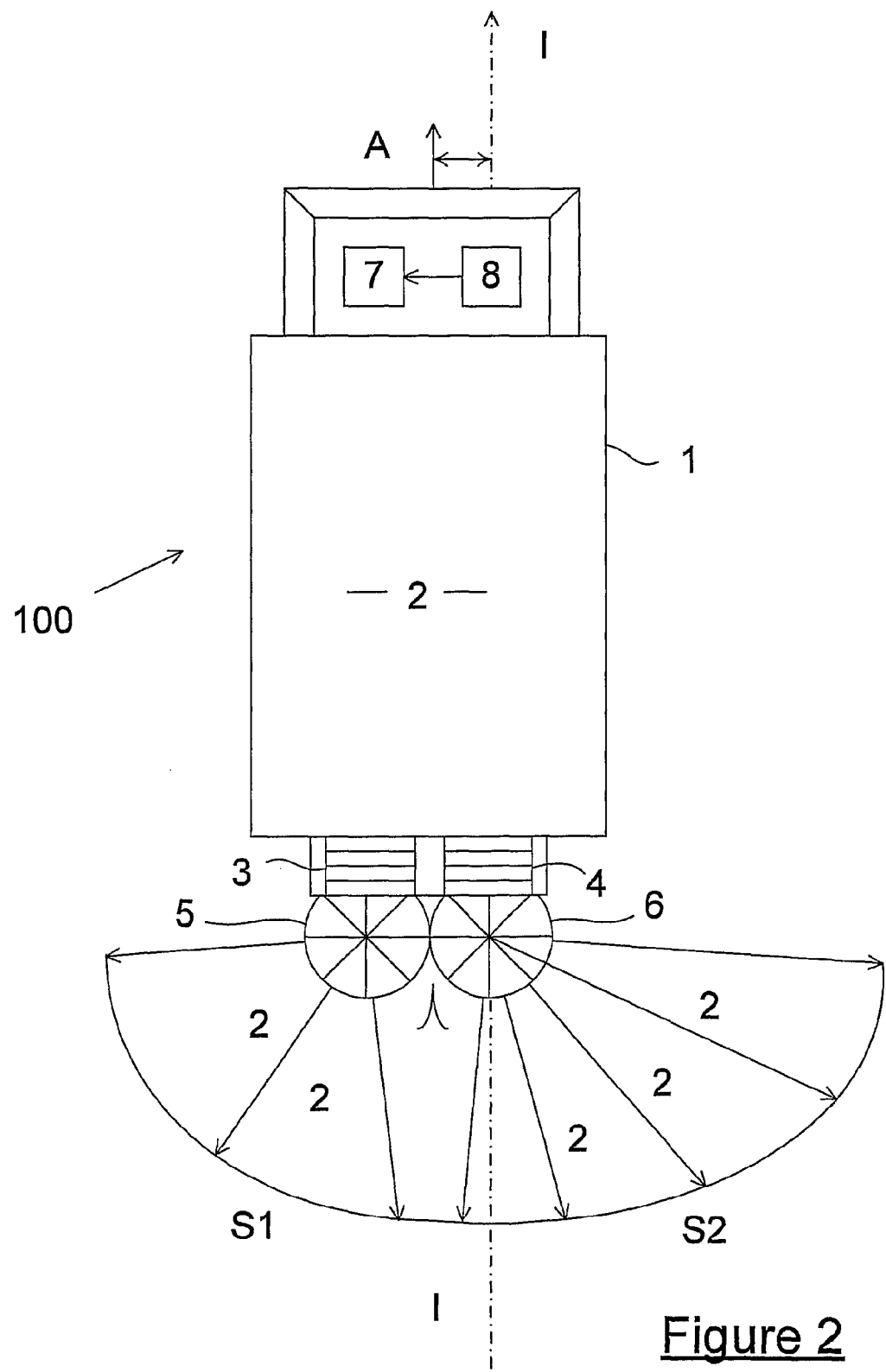
FIG. 2: Is a diagrammatic plan view of the spreader of FIG. 1, with the position of the spreader being offset from the ideal or preferred path.

In FIG. 1 the actual position and path A of the spreader 100 is substantially following the ideal or preferred path I. The control means 7 receives the position signal from the GPS sensor 8 and recognises that it is sufficiently close to the preferred or ideal position that the spread pattern should be symmetrical on each side of the spreader 100. To achieve a symmetrical spread pattern each spinner 5, 6 receives material at a substantially equal rate, and the spinners 5, 6 are operated at substantially the same rotational speed. This causes the material to be spread to an approximately equal distance on each side of the spreader 100, and approximately the same amount of material per unit area is applied on each side. The outer perimeter of the material 2 spread by the spinners 5, 6 is represented by arcs S1 and S2 respectively.

In the situation shown in FIG. 2, the actual path A is offset to the left from the ideal path I. In order to compensate the control means 7 may increase the speed of the right hand spinner 6 and decrease the speed of the left hand spinner 5. This ensures that the spread pattern is still approximately symmetrical on either side of the ideal path I, although it is offset to the right hand side of the spreader 100.

In order to ensure that the amount of material spread per unit area is constant on either side of the ideal path I, the rate at which the right hand conveyer 4 supplies material to the right hand spinner 6 may be increased, and the rate at which the left hand conveyer 3 supplies material to the left hand spinner 5 may be decreased.

Figure 3:
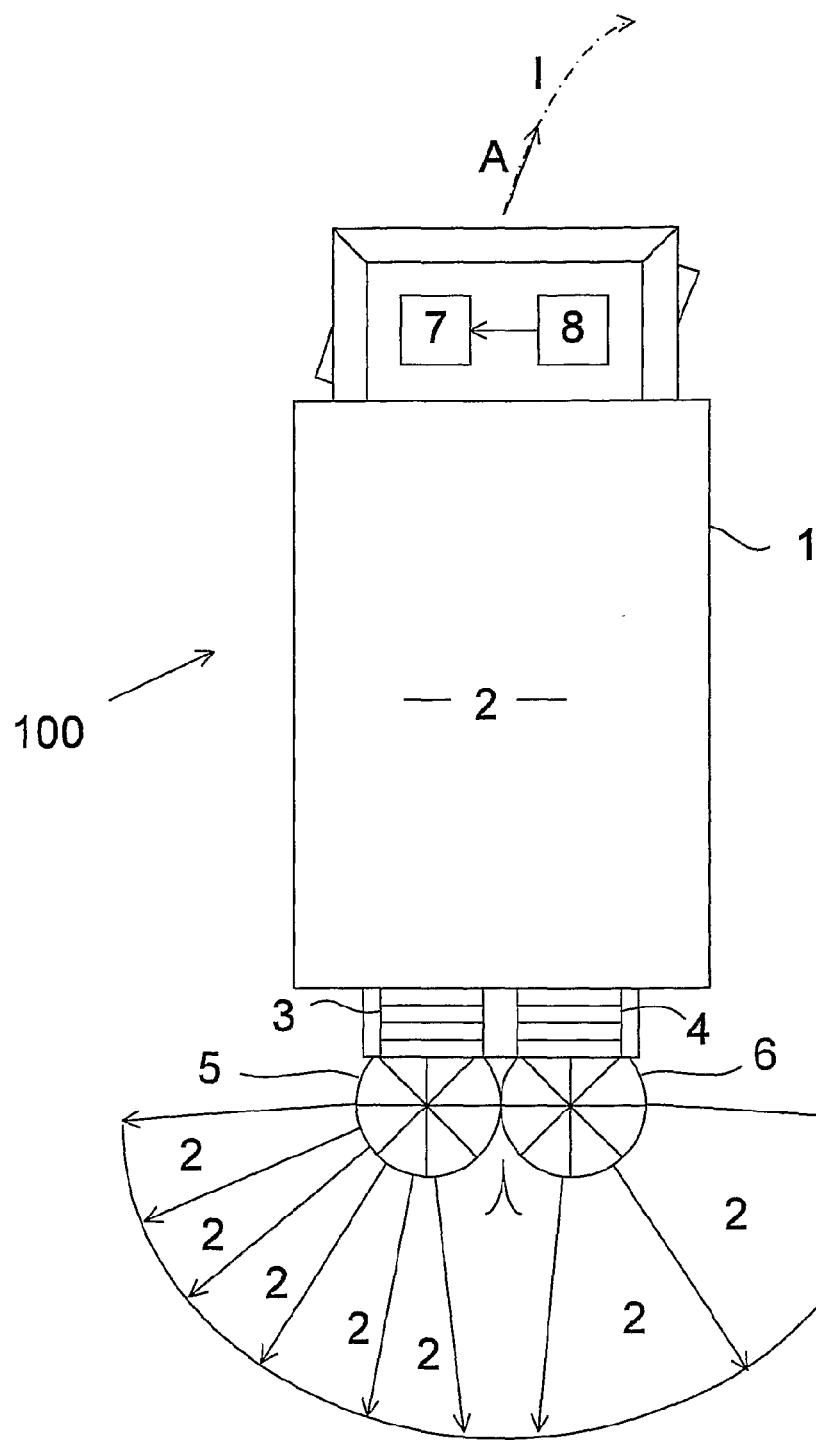
FIG. 3: Is a diagrammatic plan view of the spreader of FIG. 1, proceeding along the ideal or preferred path, where the ideal or preferred path is curved.

In the situation shown in FIG. 3, the ideal path I follows a right hand curve. In this scenario, the speed of the spinners 5, 6 may be constant, but the left hand conveyer 3 may supply additional material to the left hand spinner 5, while the rate of material supplied to the right hand spinner 6 may be reduced. In this way, approximately the same amount of material per unit area is applied on each side of the spreader, despite the curved path. Depending on the radius of the curve it may also be desirable to reduce the rate at which the inside spinner 6 is operating, in order to minimise the area which receives an overlap of material.

Figure 4:
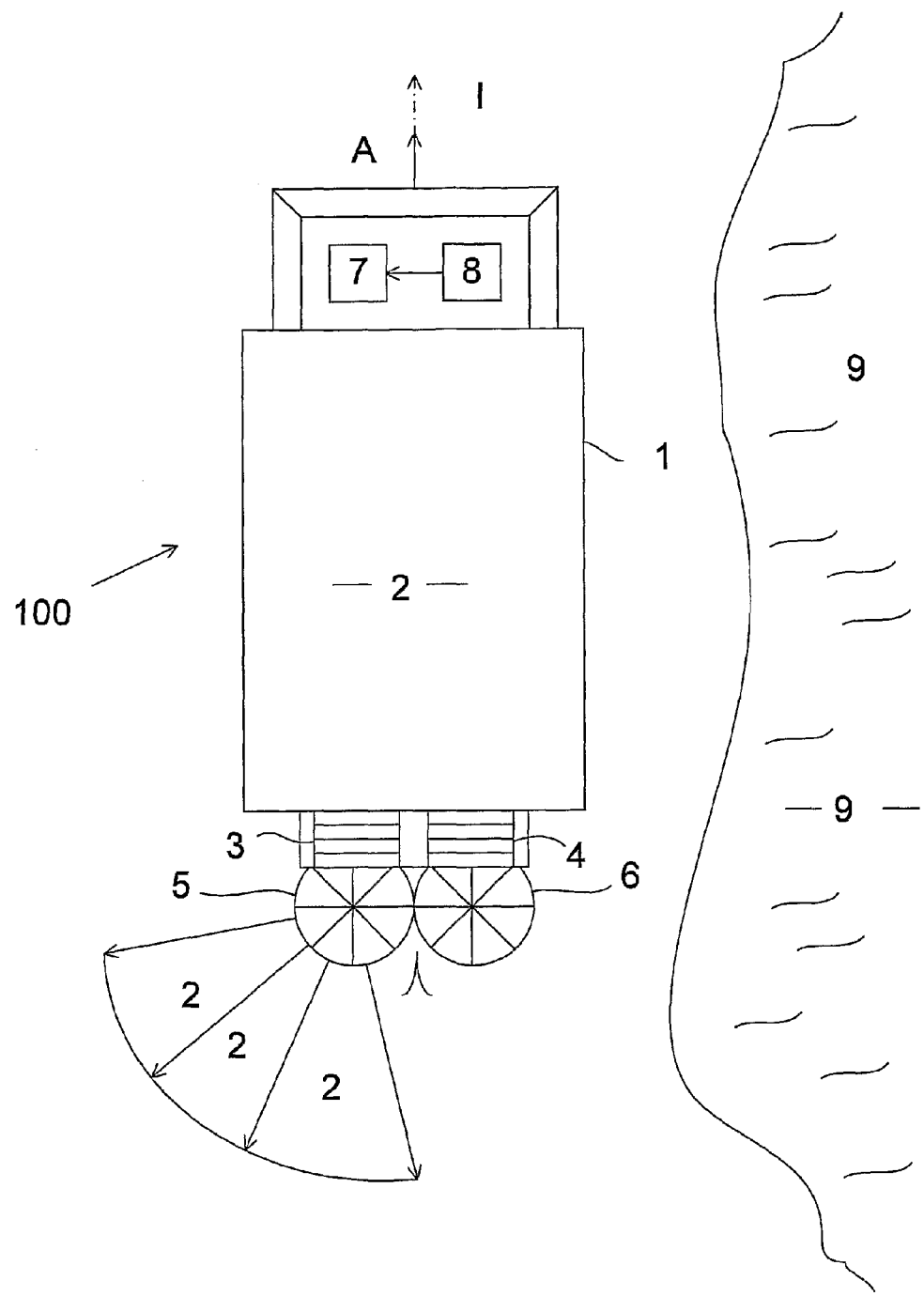
FIG. 4: Is a diagrammatic plan view of the spreader of FIG. 1, proceeding along the ideal or preferred path, where the ideal or preferred path is adjacent to an area in which material is not required.

In the situation shown in FIG. 4 the spreader 100 is approaching an area in which spreading of fertiliser is not required or is prohibited, for example a waterway 9. Here the spinner 6 closest to the waterway 9 is slowed or, as shown in the figure, shut down completely.

In yet another situation (not shown) the control means may determine that the spreader is on a slope, either by comparison of its position to a topographical map, or by receiving information from a suitable sensor. In this case the speed of the spinners and the amount of material supplied to the spinners may be varied as required to allow for the effect of the slope on the path of the material. For example, if the spreader is on a cross slope the rate of material supplied to the uphill spinner may be reduced and its speed increased, in order to ensure that the required amount of material per unit area is spread. Similarly, the rate of material supplied to the downhill spinner may be increased and the speed of the spinner decreased.

The present invention may also be particularly useful in so called "precision farming". Here the amount of fertiliser applied is not constant, but is varied to match the requirements of specific areas.

When configured for use in precision farming, the control means 7 may store information as to the amount of material to be spread on various areas. The control means may then vary the speed of the conveyors 3, 4 and/or spinners 5, 6, to ensure that the correct amount of material is spread, in accordance with the required pattern stored by the control means 7. This may involve different amounts of material being spread on either side of the spreader, even if the spreader is closely following the ideal path.

In a preferred embodiment the control means may record where the material has been spread for billing and/or auditing purposes.

Those skilled in the art will appreciate that the present invention provides a spreader which is more accurate in its distribution of material than the spreaders of the prior art, and which ensures that the material is spread at the required rate per unit area even if the driver deviates from the ideal path.

While the invention has been described with reference to a self propelled groundspeader, those skilled in the art will appreciate that it may also be applied to a trailer based unit.

While the invention has particular advantages when used in the spreading of fertiliser material, it may also have application to other spreading type apparatus, such as those used in road building and the like.

Where in the foregoing description, reference has been made to specific components or integers of the invention having known equivalents, then such equivalents are herein incorporated as if individually set forth.

Although this invention has been described by way of example and with reference to possible embodiments thereof, it is to be understood that modifications or improvements may be made thereto without departing from the spirit or scope of the appended claims.

The invention claimed is:

1. A spreader apparatus including material storage means for storing a spreadable material, a first spinner means adapted to spread the spreadable material on a first side of the spreader and a second spinner means adapted to spread the spreadable material on a second side of the spreader opposite the first side, wherein a speed of each said spinner is variable independently of a speed of the other said spinner, and transport means for transporting the spreadable material from the material storage means to the spinners, the transport means operable to supply the spreadable material to the first spinner means at a rate which is independent from a rate at which it supplies spreadable material to the second spinner means, the spreader further including Global Positioning System (GPS) receiver means for sensing the position of the spreader and providing an output signal indicative of a position of the spreader to a control means, wherein the control means calculates a required pattern and density of material to be spread by the spinner means based on a comparison of the position of the spreader to a preferred position of the spreader, and controls a rate at which the transport means transports the material to the spinners, and the speed of each spinner means, in order to obtain the required pattern and density of spread material.

2. The spreader of claim 1 wherein the control means varies the pattern and density of material spread by the spinner means as necessary to ensure that the material is spread in accordance with a predetermined pattern.

3. The spreader of claim 1 wherein the control means varies the pattern and density of material spread by the spinner means as necessary to ensure that the material is spread evenly.

4. The spreader of claim 1 including means to minimise crossover or overlap of material distributed by the first and second spinner means.

5. The spreader of claim 1 wherein the transport means includes a belt conveyor or a chain conveyor.

6. The spreader of claim 1 wherein the transport means includes a first conveyor adapted to transport material from the material storage means to the first spinner means and a second conveyor adapted to transport material from the material storage means to the second spinner means.

7. The spreader of claim 6 wherein the speed of the first conveyor is adjustable independently from the speed of the second conveyor.

8. The spreader of claim 1 wherein the control means is adapted to store information as to the area in which material has been spread.

9. A method of controlling the pattern and density of material spread by a spreader apparatus having a GPS receiver means, a material storage means for storing a spreadable material, a control means, a first spinner means adapted to spread the spreadable material on a first side of the spreader and a second spinner means adapted to spread the spreadable material on a second side of the spreader opposite the first side, wherein a speed of each said spinner is variable independently of a speed of the other said spinner, and a transport means for transporting the material from the storage means to the spinners, the method including:
- receiving, by the control means, a signal from the GPS receiver means which is indicative of the actual position of the spreader apparatus;
- calculating, by the control means, a required pattern and density of material to be spread by the spinner means based on comparing the actual position of the spreader apparatus to a preferred position of the spreader apparatus;
- controlling, by the control means, a rate at which the transport means supplies the spreadable material to the first spinner means independently from a rate at which it supplies spreadable material to the second spinner means; and
- controlling, by the control means, a rate at which the transport means transports the material to the spinners, and the speed of the spinner means, in order to obtain the required pattern and density of spread material.

10. The method of claim 9 including varying the pattern and density of material spread by the spinner means as necessary to ensure that the material is spread in accordance with a predetermined pattern.

11. The method of claim 9 including varying the pattern and density of material spread by the spinner means as necessary to ensure that the material is spread evenly.

12. The method of claim 9 wherein the transport means includes a first conveyor adapted to transport material from a material storage means associated with the spreader to the first spinner means, and a second conveyor adapted to transport material from the material storage means to the second spinner means, and wherein the speed of the first conveyor is adjustable independently from the speed of the second conveyor.

* * * * *